May 21, 1929. H. R. DE VEAU 1,714,462

SEAT ADJUSTER FOR VEHICLES

Original Filed April 22, 1924   2 Sheets-Sheet 1

INVENTOR
Harry R. DeVeau
BY
ATTORNEY

May 21, 1929.  H. R. DE VEAU  1,714,462
SEAT ADJUSTER FOR VEHICLES
Original Filed April 22, 1924   2 Sheets-Sheet 2
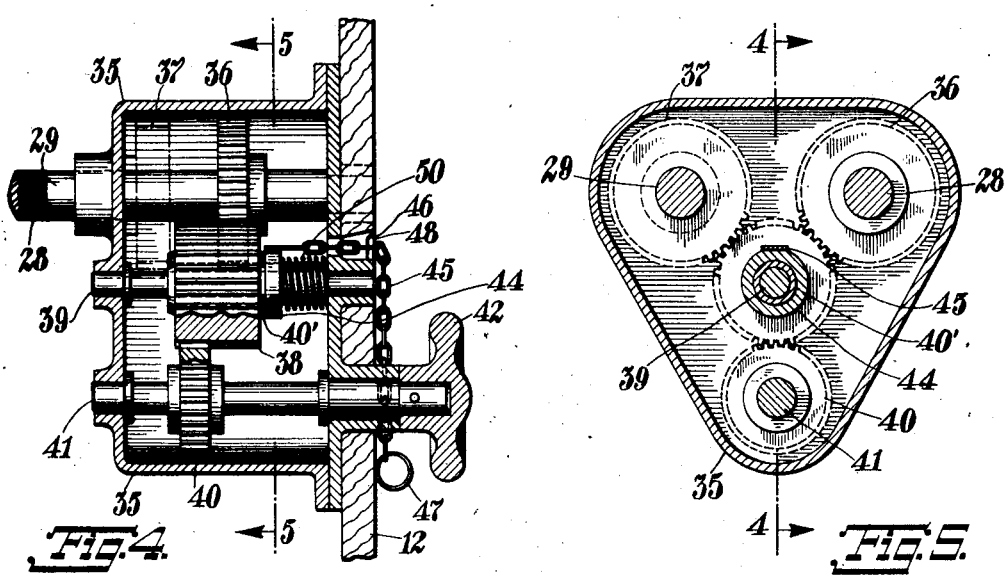
INVENTOR
Harry R. DeVeau
BY
ATTORNEY Patented May 21, 1929.

1,714,462

UNITED STATES PATENT OFFICE.

HARRY R. DE VEAU, OF STAMFORD, CONNECTICUT, ASSIGNOR TO DERAY MANUFACTURING CORPORATION, OF KENT COUNTY, DELAWARE.

SEAT ADJUSTER FOR VEHICLES.

Application filed April 22, 1924, Serial No. 708,125. Renewed August 20, 1928.

This invention relates to an adjustable seat for automobiles or like vehicles, the invention being intended more particularly for embodiment, in or application to, the driver's seat. The present invention is a further development of one disclosed in a previous application for patent filed by me on March 10, 1923, under Serial No. 624,133, and it has for its object to improve and simplify the seat and seat back adjusting means.

For further comprehension of the invention, and of the objects and advantages thereof, reference will be had to the following description and accompanying drawing, and to the appended claims in which the various novel features of the invention are more particularly set forth.

Fig. 1 of the drawing is a perspective view showing my improved adjustable seat as applied to an automobile.

Fig. 4 is a detail vertical sectional view showing the means for adjusting the seat and back either individually or as a unit, this view being taken along the line 4—4 of Fig. 5 but showing the gears in elevation.

Fig. 5 is a transverse sectional view taken on the line 5—5 of Fig. 4.

Figure 1:
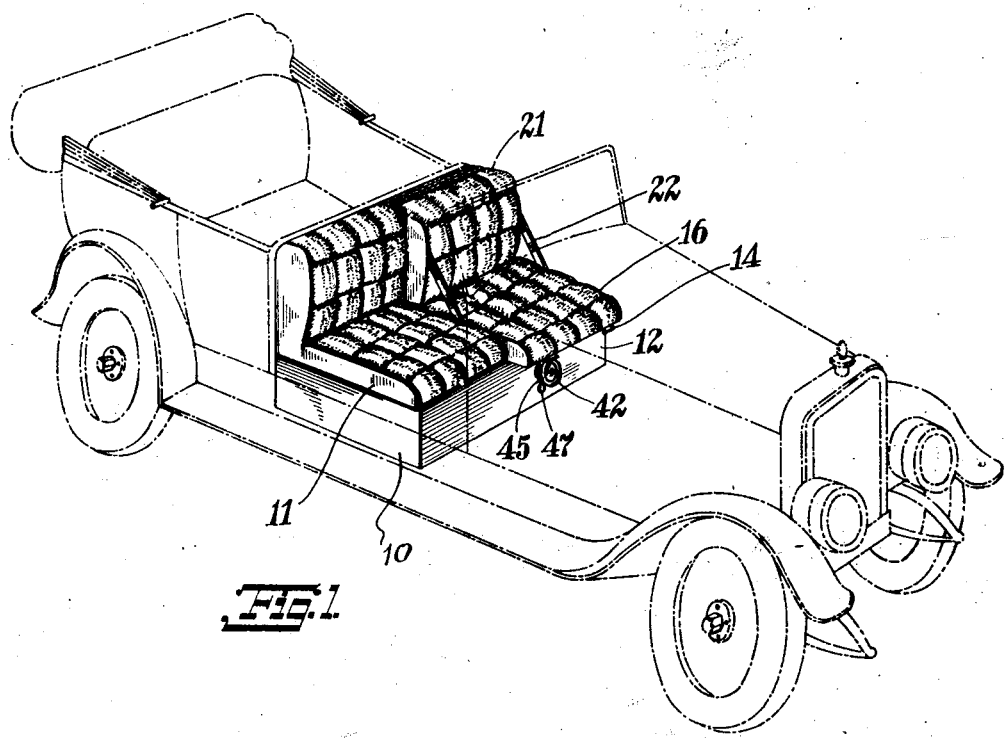
Figure 2:
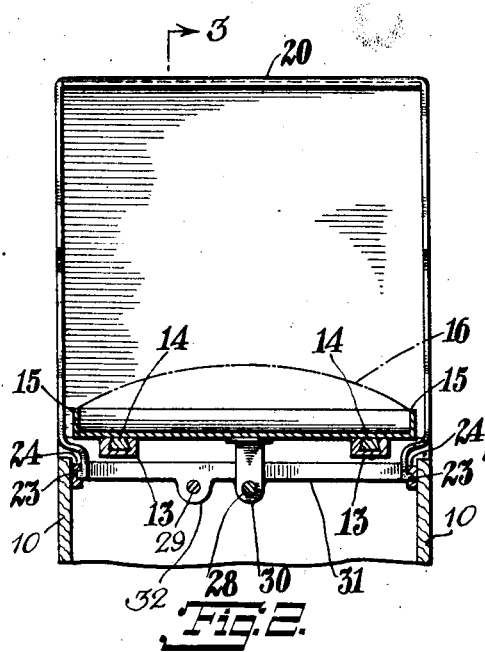
Fig. 2 is a transverse vertical sectional view thereof, this view being taken on the line 2—2 of Fig. 3.
Figure 3:
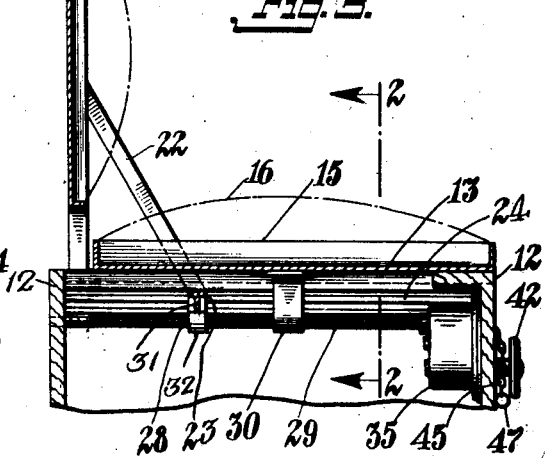
Fig. 3 is a longitudinal vertical sectional view thereof taken on the line 3—3 of Fig. 2.

To support my improved seat I provide a pair of side boards 10 which extend along opposite sides of the seat proper, the front seat of the automobile being here shown as formed in two sections of which one, indicated at 11, is fixed, the other section being for the driver, and being adjustable according to my invention, it being understood that the side boards 10 are under the sides of this adjustable section. These side boards 10 are rigidly connected by end boards 12, forming an open frame on which the seat is supported. Extending along the top of this frame are a pair of channeled guide bars 13 which are fixed at opposite ends in the end boards 12 and which are formed with dovetailed grooves therein in which engage tongues 14 formed on the lower face of the frame element 15 of the seat proper, which may be provided with the usual upholstery indicated at 16.

For supporting the back of the seat I provide a transverse frame element 20 to which the usual upholstery 21 is attached. The frame element is formed with a pair of downwardly extended rigid straps 22 on each side which are bent at their lower ends to project downwardly inside the confines of the seat frame, and have tongues 23 fastened to their lower ends and engaging freely in channeled guides 24 fixed to the side boards 10 whereby the back element is slidably supported.

For adjustment of the seat and back elements I provide a pair of screw shafts 28 and 29 respectively which extend longitudinally under the seat element and are suitably journaled at their rear ends in the rear one of the end boards 12. Depending from the seat frame 15 is a threaded member or nut 30 through which the shaft 28 passes, while a crossbar 31 extends rigidly between oppositely disposed straps 22 and has the shaft 29 threaded through a boss 32 thereon.

At their front ends the shafts 28 and 29 engage in, and are supported by, a casing 35 secured to the inside of the front end board 12. Fixed on the respective shafts 28 and 29, within the casing 35, are the gears 36 and 37 which are adapted to be engaged as desired by an elongated idler pinion 38 freely mounted on a shaft 39 fixed in the casing 35, these pinions being spaced from one another longitudinally of the shafts. This idler pinion 38 is engaged at all times by a shorter pinion 40 fixed on another shaft 41 rotatably mounted in the casing 35 and projecting at its front end therefrom, and through the end board 12, and having a handwheel 42 on its projecting end whereby it may be rotated. The pinion 38 is formed with a hub extension 40′ in which is a peripheral groove having seated freely therein a ring 44 to which is rigidly attached one end of a flat chain 45 which projects forwardly through an aperture 46 extending through the casing and the end board 12. A ring 47 is mounted on the outer end of the chain 46. The links of the chain may be selectively engaged with a pin 48 fixed to the member 35 whereby the idler pinion 38 is held against longitudinal movement in adjusted positions. A coiled expansion spring 50 urges the idler pinion 38 along the shaft 39, in a direction opposite to that in which it is pulled by the chain 45. By adjusting the idler 38 along the shaft 39 it may be positioned in engagement with either of the gears 36, 37 or in engagement with both of said gears, so that either the seat element or the back element may be individually adjusted by rotating the handwheel 42, or the two may be adjusted in unison.

Having thus described my invention what I claim as new and desire to protect by Letters Patent of the United States is as follows:—

1. In a vehicle, a seat, a separate back for said seat, guides for said seat and back to permit of forward or backward adjustment thereof, a pair of screw shafts engaged with the respective back and seat to adjust the same by rotation of the said shafts, gears fixed to the respective shafts, a movable idler adapted to be engaged individually with either of said gears, or with both together, a pinion meshing with said idler, a handwheel for rotating said pinion and means for holding said idler in adjusted positions.

2. In a vehicle, a seat, a separate back for said seat, guides for said seat and back to permit of forward or backward adjustment thereof, a pair of screw shafts engaged with the respective back and seat to adjust the same by rotation of the said shafts, gears fixed to the respective shafts, a movable idler adapted to be engaged with either of said gears, a pinion meshing with said idler, and a handwheel for rotating said pinion, and means for holding said idler in adjusted positions.

3. In a vehicle, a seat, a separate back for said seat, guides for said seat and back to permit of forward or backward adjustment thereof, a pair of screw shafts engaged with the respective back and seat to adjust the same by rotation of the said shafts, gears fixed to the respective shafts and spaced longitudinally of the shafts from one another, an elongated idler adapted to engage either or both of said gears, a shaft on which said idler is freely mounted, a pinion meshing with said idler, a shaft on which said pinion is fixed, and a handwheel fixed to said last named shaft.

4. In a vehicle, a seat, a separate back for said seat, guides for said seat and back to permit of forward or backward adjustment thereof, a pair of screw shafts engaged with the respective back and seat to adjust the same by rotation of the said shafts, gears fixed to the respective shafts and spaced longitudinally of the shafts from one another, an elongated idler adapted to engage either or both of said gears, a shaft on which said idler is freely mounted, a pinion meshing with said idler, a shaft on which said pinion is fixed, and a handwheel fixed to said last named shaft, and means for securing said idler in adjusted positions along its shaft.

5. In a vehicle, a seat, a separate back for said seat, guides for said seat and back to permit of forward or backward adjustment thereof, a pair of screw shafts engaged with the respective back and seat to adjust the same by rotation of the said shafts, gears fixed to the respective shafts, an axially movable idler adapted to be engaged with either of said gears, a pinion meshing with said idler, a handwheel meshing for rotating said pinion, and means for holding said idler in adjusted positions, comprising a spring urging said idler in one direction, a chain attached at one end to said idler, and a fixed pin to which said chain may be attached at various points along its length.

In testimony whereof I have affixed my signature.

HARRY R. DE VEAU